Oct. 5, 1965 W. C. LENT 3,210,656

SWEPT FREQUENCY CIRCUIT TESTING SYSTEM

Filed March 7, 1960

INVENTOR.
WORTHINGTON C. LENT
BY
Christie, Parker & Hale
ATTORNEYS 3,210,656
SWEPT FREQUENCY CIRCUIT TESTING SYSTEM Worthington C. Lent, Whittier, Calif., assignor to Lear Siegler, Inc., a corporation of Delaware Filed Mar. 7, 1960, Ser. No. 13,158
2 Claims. (Cl. 324—57)

Figures 1, 2:
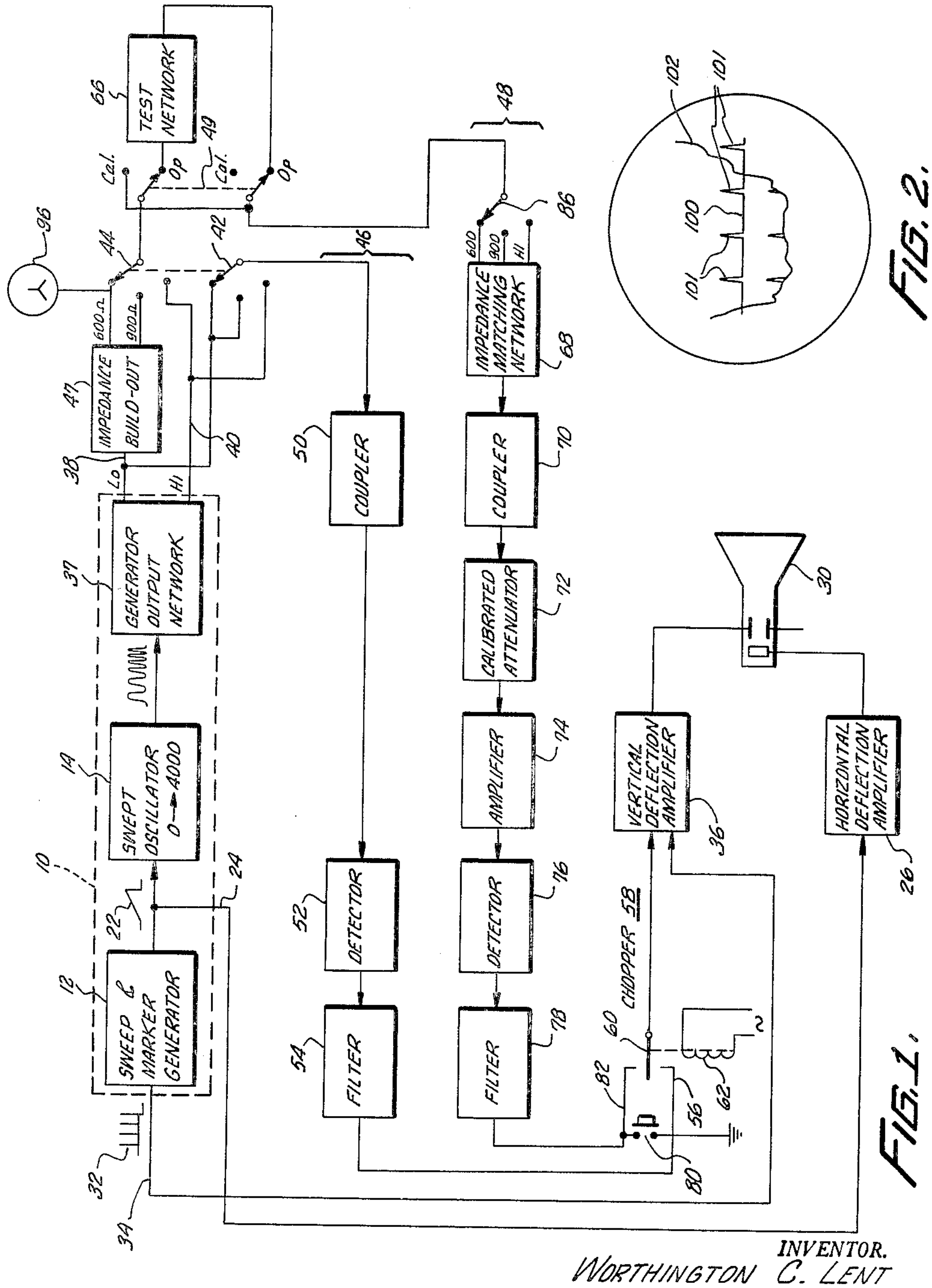

This invention relates to circuit testing and, more particularly, to apparatus for determining the transmission characteristics of circuits such as those used in telephone communication systems.

Although this invention can be used for testing the characteristics of many different components and types of circuits, it finds particular application in the testing of telephone circuits, and is described in detail with respect to that application, although the invention is not so limited.

The nationwide telephone service in use today requires careful systems engineering to obtain and maintain uniform transmission standards to transmit signals in the audio range without excessive variations of gain or loss of the signal over the frequency range of normal speech. Transmission measurements are the essential means by which telephone circuit performance characteristics are checked and maintained during operation.

Transmission testing techniques presently used are laborious and costly because several technicians using a number of electronic instruments are required. Consequently, achievement of useful results requires skilled personnel capable of exercising some judgment in application and interpretation. Telephone service has expanded in recent years at a rate exceeding that at which testing skills can be supplied in sufficient quantity or at a cost which can be justified.

This invention provides a simple, compact and portable instrument which can be used by a single technician in a central telephone exchange to determine in a matter of minutes the quality and condition of a line or circuit. Specifically, the preferred embodiment of this invention can:

(1) Measure insertion power gain or loss of any of the voice-band equipment or circuits now in service.

(2) Provide a simultaneous whole-band, i.e., the normal audio frequency range, display of relative input impedance, and the transmission-frequency characteristic at the output, of devices such as negative-impedance repeaters, equalizer networks, and hybrid networks, whose proper operation depends upon in-circuit adjustment.

(3) Provide a whole-band display of the relative input-impedance charatceristics of loaded lines to detect load misplacement or other impedance irregularities.

(4) Display whole-band trans-hybrid transmission and measure the corresponding loss for the purpose of perfecting terminations and office balance.

Briefly, the apparatus of this invention comprises means for applying a voltage varying in frequency to the input, for example, of a line or other telephone transmission circuit. Means are provided at the line output for detecting and indicating the voltage at the line output as a function of frequency, and means are also provided for indicating the voltage applied to the line input. Means are included for simultaneously indicating the voltage as a function of frequency as applied to the line input and derived from the line output so that the transmission characteristics of the line at different frequencies may be observed.

In the preferred form of the invention, a test signal is applied to a circuit to be tested. Two parallel output channels are provided, one of which is a reference channel connected to the input end of the circuit to be tested, and the other being a comparison channel connected to the output end of the circuit to be tested.

The output of each of the two channels is periodically sampled, say at 60 cycles per second, and applied to one set of the deflection plates of a cathode ray tube, while a sweep signal is applied to the other deflection plates of the tube. Marker pulses, representative of different frequencies of the test signal, are applied to the same deflection plates of the cathode ray tube as the outputs of the two channels. Thus the cathode ray tube presents two traces, one a reference trace which represents the input signal, and a comparison trace which represents the output signal from the test network. The relative vertical positions of the two traces gives a visual indication of the gain or loss of the signal passing through the network, and the frequency marking signals on both traces make it easy to determine the frequency at which gain or loss occurs.

In the preferred embodiment of the invention, the comparison channel includes a calibrated attenuator by which the signals passing through the comparison channel can be increased or decreased so that the respective traces on the scope can be superimposed at any frequency of interest and thereby provide direct measurement of the insertion power loss or gain of a circuit for that particular frequency.

These and other aspects of the invention will be more fully understood from the following detailed description taken in conjunction with the accompanying drawing, in which:

FIG. 1 is a schematic block diagram of the presently preferred embodiment of the invention; and FIG. 2 is a pictorial showing of typical patterns obtained on the cathode ray tube for different types of test circuits.

Referring to FIG. 1, a signal generator 10 includes a sweep and marker generator 12 connected to a swept oscillator 14. The sweep and marker generator develops a sawtooth pulse 22 which is carried by a line 24 to a horizontal deflection amplifier 26 and then to the horizontal deflection plates of a cathode ray tube 30. The sweep and marker generator also develops four marker pulses 32, which are applied through a line 34 to a vertical deflection amplifier 36, the output of which is applied to the vertical deflection plates of the cathode ray tube. The four marker pulses are generated in the same period as the sawtooth pulse, which conveniently may be one cycle per second so that four marker pulses are also generated each second.

The swept oscillator must be highly stable and be electronically tunable over a range of frequency, such as from zero to 4,000 cycles per second, with each sweep excursion of the sawtooth pulse. The voltage output is constant over the entire swept frequency range. A generator output network 37 can provide either a low impedance or high impedance balanced output signal from the oscillator and can be taken out through either a low impedance leg 38 or through a high impedance leg 40. For example, the low impedance output 38 may provide an effective internal impedance of approximately 30 ohms, and the high impedance output 40 may have an internal impedance of approximately 25,000 ohms.

A three-position switch 42, in two of its positions, connects the low impedance leg to the input of a reference channel, indicated generally at 46. The low impedance leg is also connected to an impedance build-out circuit 47 that provides a 600 ohm or 900 ohm source impedance for use in the more common insertion-loss measurements. It should be noted that since the circuit and the access points of most voice-band equipment in a telephone plant are balanced to ground, the generator output branches are also so balanced. Thus all access to the signal generator is on a balanced basis so that no auxiliary transformers are required for any of the normal applications in the typical telephone plant. When the reference channel is connected to the low impedance leg, it is coupled to a point of reference which is invariant in both amplitude and impedance. The impedance build-out provides sufficient isolation from the load so that the low impedance output of the signal generator provides a constant power reference source.

The switch 42, in the third position, connects the reference channel to the high impedance leg 40 of the signal generator 10. This is useful for bridging measurements, such as those at the terminals of a negative-impedance repeater for example. In this case, the reference channel 46 is sensitive to impedance variations of any test load coupled to the output of the signal generator. This will be discussed in more detail hereinafter.

Another three-position switch 44 serves to couple the input of a test network 66 to the signal generator 10 through respectively the 600 ohm build-out, the 900 ohm build-out, or the high impedance leg 40. The switches 42 and 44 may be mechanically ganged together, as indicated by the dotted line.

The output of the test network 66 in turn is coupled to the input of a comparison channel, indicated generally at 48. A calibration switch 49, which is a double-pole double-throw switch normally connects the switch 44 to the test network input and connects the test network output to the comparison channel. This is the Operate condition. The switch 49, in the Calibrate position, disconnects switch 44 from the input of the test network 66 and connects it directly to the comparison channel.

The reference channel 46 includes a high input impedance balanced-to-unbalanced coupler 50 connected to drive an envelope detector 52, which in turn is connected to a low pass filter 54 that has a cutoff frequency well below the lowest frequency in the output wave of interest from the signal generator 10. For voice transmission, the cutoff frequency of the low pass filter should normally be well below about 200 c.p.s., say about 150 c.p.s. The filter must also provide direct coupling for passing D.-C. component of the detector output. The output of the low pass filter terminates in a first contact 56 of a mechanical chopper or contact modulator 58 having a movable armature 60 driven by a coil 62 at any suitable frequency, say at 60 cycles per second from a conventional source.

The comparison channel 48 includes a conventional impedance matching network 68 to provide a matched termination, a high input impedance balanced-to-unbalanced coupler 70, a calibrated attenuator 72, a high gain amplifier 74, an envelope detector 76, and a low pass filter 78. The coupler, detector and low pass filter of the comparison channel are identical with the corresponding elements of the reference channel. The output of the low pass filter of the comparison channel passes to a second contact 82 of the mechanical chopper. A push-botton switch 80, when operated, grounds the output of the filter. The armature of the chopper is directly coupled to the vertical deflection amplifier of the cathode ray tube. The vertical deflection amplifier is direct-coupled so that vertical deflection of the cathode ray beam indicates any D.-C. component in the outputs of the detectors 52 and 76. A three-position switch 86 in the comparison channel provides a selected termination impedance by means of the network 68 for coupling the output of the test network 66 to the input of the coupler 70 of the comparison channel.

A meter 96 is connected to the 600 ohm output provided by the impedance build-out network 47. The meter is calibrated to indicate when the signal generator is providing a standard zero level of one milliwatt, 600 ohm output.

The operation of the apparatus is as follows: The instrument is conditioned for use by adjusting the intensity, focus and the horizontal and vertical position control for a normal display as with any cathode ray tube. The reference channel coupler is connected to the output of the signal generator through switch 42 to either the high or low internal impedance leg. The swept frequency output of the signal generator is detected, filtered and sampled by the contact modulator at the rate of 60 c.p.s., producing a horizontal reference trace 100 with four vertical marking pulses 101 as the sawtooth pulse is applied from the sweep generator to the horizontal deflection plates of the cathode ray tube. See FIG. 2.

The comparison channel is calibrated by switching the comparison channel coupler, with a properly chosen termination, directly to the corresponding output of the generator output network with switch 49 in the Calibrate position shown in FIG. 1. The calibrated attenuator is set at reference zero, and adjustment of the high gain amplifier 74 is made to obtain coincidence of the two signals picked up by the contact modulator, which is indicated by the appearance of a single horizontal trace on the cathode ray tube. The push-botton switch 80 in the output of the comparison channel is used to disable the comparison channel output if needed to aid in identifying the two independent traces from each other. The gain adjustment of the high gain amplifier is not changed again during measurement except for recalibration, should it become necessary.

The insertion power gain or loss of a device is defined as the ratio of the power which would appear in a specified load, when connected to a generator having an internal impedance equal to the load, to the power which would appear in the same load when the device to be measured is inserted between the load and the generator. As mentioned above, the low impedance leg provides a constant power reference. Therefore, the voltage across the termination load, as indicated by the cathode ray scope, in the calibration operation without the test network connected, can be considered a reference for power at the load. As long as the voltage is held constant, the power is constant.

The test network is then inserted between the generator and termination load by moving the switch 49 to the operate position. Because direct coupling of the direct current component is provided from the output of the detectors 52 and 76 to the vertical deflection plates, the reference trace on the scope remains fixed in position, and the comparison trace is modified by the insertion characteristics of the test network. The attenuator may then be readjusted until coincidence between the reference trace and the comparison trace is achieved at any selected point along the trace, corresponding to a selected frequency. The difference in the new attenuator setting from the reference setting is a measure of the power gain or loss of the device. The attenuator can be directly calibrated in db.

More specifically, to make a power gain or loss insertion measurement of a device after calibration of the reference channel, the comparison coupler input is transferred from the output of the signal generator to the output of the device under test, the input of which is connected to the signal generator as shown in FIG. 1 by setting the second switch 49 to the Operate position. The outputs of the reference channel and comparison channel with the test network 66 now in the circuit are sampled at a rate of 60 cycles per second by the chopper 58 and applied to the vertical deflection plates of the cathode ray tube to form reference trace 100 and a comparison trace 102 on the cathode ray tube, which may have a shape such as that shown in FIG. 2. The comparison trace also includes four marking pulses 103. Any loss or gain in the circuit under test as a function of frequency is evidenced by the departure of the comparison trace 102 from coincidence with the reference trace 100. At those points, in frequency, where coincidence is retained, the gain or loss is zero. Coincidence of the two traces may be restored at any frequency by manipulating the calibrated attenuator. The gain or loss of the device or circuit under test is read directly from the attenuator dials to an accuracy of at least one decibel. Sufficient gain and attenuator range are provided so that losses as high as 55 decibels and gains as high as 35 decibels may be measured. This range is sufficient to embrace that required for measurement of all normal transhybrid loss and the gain of all commonly used repeaters.

The location, in frequency, along the horizontal axis of the cathode ray tube screen is established by the marking pulses appearing at 1,000 cycle intervals. The start of the trace is zero and the generator frequency excursion is adjusted so that the termination of the trace occurs at 4,000 cycles per second. Four distinct marks will appear in the interval, at 1,000, 2,000, 3,000 and 4,000 cycles per second. Since the sweep excursion is essentially linear, visual interpolation between the marks is relatively easy and the points of trace coincidence may, therefore, be located in frequency.

Some devices to be tested, such as negative-impedance repeaters, depend upon in-circuit impedance conditions for proper operation and are most effectively tested and adjusted under those conditions. The high internal impedance leg of the signal generator permits bridging of such devices at the line terminals without disturbing the in-circuit conditions of the devices. Accordingly, for bridging measurements, such as those at the terminals of the negative-impedance repeaters, the high impedance leg of the signal generator is used. Reference channel calibration is established by connecting the reference coupler, without termination, directly to the generator. All other steps in the measurement procedure remain the same as for insertion measurements. The reference trace is, however, now sensitive to the impedance variations at the repeater and therefore yields important information as to the ability of the strapping to provide nonreflective terminations for the lines.

The envelope detectors used in both the reference and comparison channels provide an important advantage by making it possible for the display traces on the cathode ray tube to contain only those portions of the output waves which bear useful information. This means that in the circuit of this invention, the cathode ray beam is not spending most of its time in tracing out portions of the wave containing no useful information. Thus the use of the envelope detectors in this invention permits high trace intensity at the peaks of voltage, even at the rapid writing rate of the cathode ray tube. By using the envelope detection, only the envelope information is presented to the cathode ray tube, and the result is a well defined intense line, identical in nature to that of a manual graphic plot.

An important aspect of the invention is that direct coupling of the D.-C. component at the output of the detectors to the vertical deflection plates of the cathode ray scope is provided. Unless this is done, the reference trace is floating. Coincidence of the two traces could not be restored at any selected frequency and no quantitative results would be possible.

What is claimed is:

1. Apparatus for measuring the power gain or loss as a function of frequency of a network having an input and an output, comprising an oscillator; means for sweeping the frequency of the oscillator through a fixed band repeatedly at a low repetition rate, the output of the oscillator being coupled to the input of the network; a cathode ray scope including first and second beam-deflection means; means responsive to the frequency sweeping means for actuating the first beam-deflection means to deflect the cathode ray beam in proportion to the frequency of the oscillator output; means for actuating the second beam-deflection means to deflect the cathode ray beam at predetermined frequencies of the oscillator output to provide a frequency reference on the scope; reference channel means including an amplitude detector and low pass filter, the output of the oscillator being coupled to the input of the reference channel means; comparison channel means including a calibrated attenuator, amplifier, amplitude detector, and low pass filter; means for selectively coupling the output of the oscillator and the output of the network to the input of the comparison channel means; switching means for alternately connecting the output of the reference channel means and the comparison channel means directly to the second beam-deflection means, the low pass filters, the switching means, and the second beam deflection means being direct-coupled to respond to the D.-C. component of the detector outputs; and means for driving the switching means at a frequency which is substantially higher than the sweep repetition rate.

2. Apparatus for measuring the power gain or loss as a function of frequency of a network having an input and an output, comprising an oscillator; means for repetitively sweeping the frequency of the oscillator at a fixed repetition rate, the output of the oscillator being coupled to the input of the network; a cathode ray scope including first and second beam-deflection means; means responsive to the frequency sweeping means for actuating the first beam-deflection means to deflect the cathode ray beam in proportion to the frequency of the oscillator output; means for actuating the second beam-deflection means to deflect the cathode ray beam at predetermined frequencies of the oscillator output to provide a frequency reference on the scope; reference channel means including an amplitude detector and low pass filter, the output of the oscillator being coupled to the input of the reference channel means; comparison channel means including a calibrated attenuator, amplifier, amplitude detector, and low pass filter; means for selectively coupling the output of the oscillator and the output of the network to the input of the comparison channel means; switching means for alternately connecting the output of the reference channel means and the comparison channel means directly to the second beam-deflection means, the low pass filters, switching means, and second beam-deflection means being direct-coupled to respond to the D.-C. component of the detector outputs; and means for driving the switching means at a frequency which is substantially higher than the sweep repetition rate.

References Cited by the Examiner

UNITED STATES PATENTS

| | | | |
|---|---|---|---|
| 2,175,001 | 10/39 | Sherman | 324—57 X |
| 2,252,058 | 8/41 | Bond | 324—57 X |
| 2,534,957 | 12/50 | Delvaux | 324—57 |
| 2,595,263 | 5/52 | Ingalls | 324—57 X |
| 2,610,228 | 9/52 | Devine | 324—57 |
| 2,618,686 | 11/52 | De Lange | 324—57 |
| 2,626,980 | 1/53 | Balde et al. | 324—57 |
| 2,755,436 | 7/56 | Heinz | 324—57 |
| 2,763,835 | 9/56 | Lundgren | 324—57 |
| 2,951,200 | 8/60 | Critchlow | 324—57 |
| 2,982,910 | 5/61 | De Boisblanc | 324—57 |

FOREIGN PATENTS

| | | |
|---|---|---|
| 431,731 | 7/35 | Great Britain. |
| 569,279 | 5/45 | Great Britain. |

WALTER L. CARLSON, *Primary Examiner.*

LLOYD McCOLLUM, SAMUEL BERNSTEIN, *Examiners.*